United States Patent Office 3,559,338
Patented Feb. 2, 1971

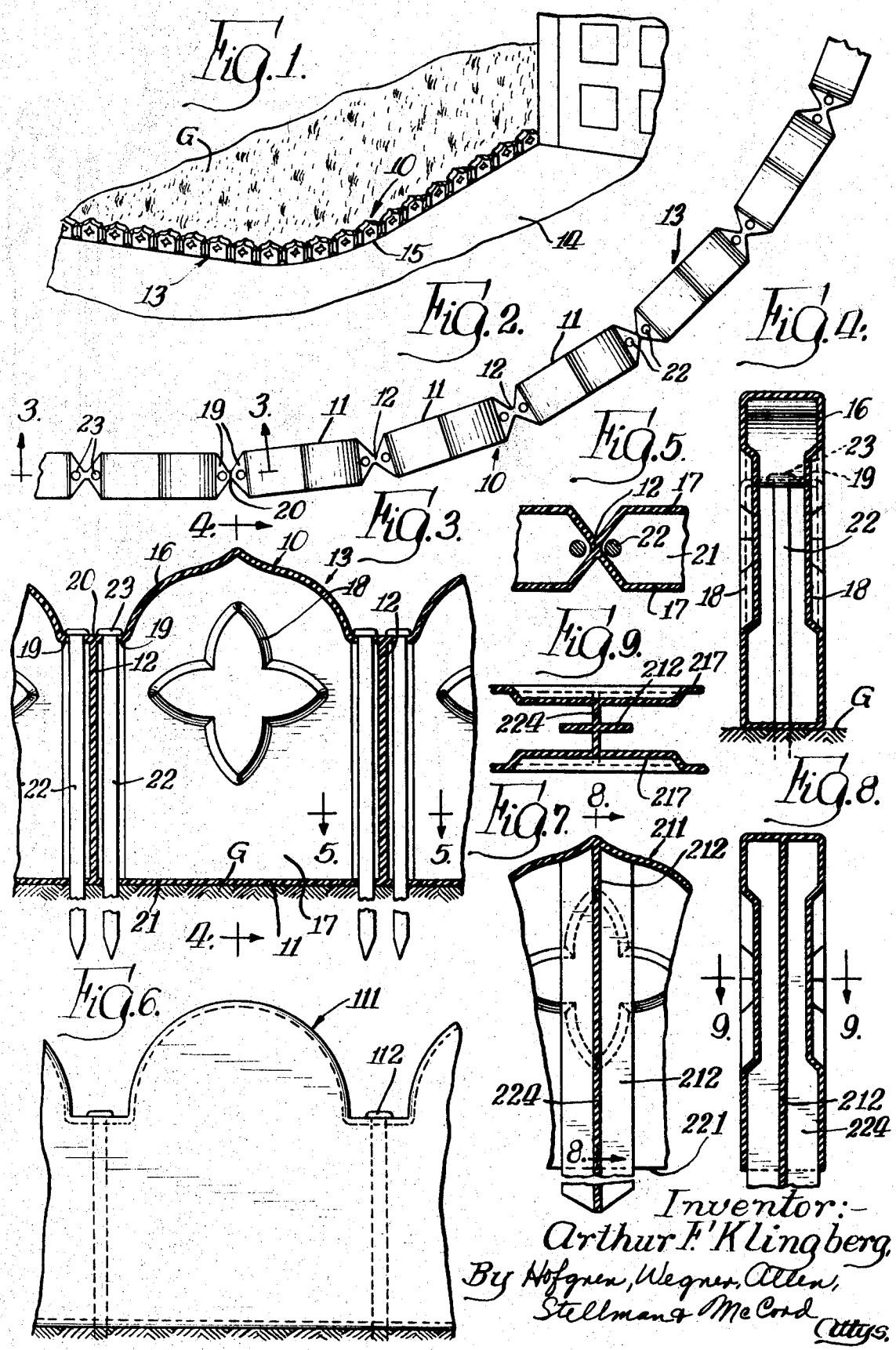

3,559,338
DRIVEWAY EDGING
Arthur F. Klingberg, McHenry, Ill., assignor to Janier Plastic Mold Corporation, a corporation of Illinois
Filed Apr. 29, 1968, Ser. No. 725,075
Int. Cl. A01g 1/08
U.S. Cl. 47—33   13 Claims

ABSTRACT OF THE DISCLOSURE

A driveway edging structure including a plurality of blocks and hinge means formed integrally with the blocks connecting the blocks to define an elongated unitary edging structure. The hinge means permits the edging structure to extend lengthwise substantially along the driveway edge which may be nonrectilinear. Stake means are associated with the edging for retaining the edging structure along the driveway edge.

BACKGROUND OF THE INVENTION

Field of the invention

This invention relates to edging structures, and in particular, to driveway edging structures.

Description of the prior art

One form of driveway edging comirses a plurality of stone or cement blocks placed on edge to upstand along the driveway edge and define an edging or curbing having a desirable aesthetic effect. Such edging structures have the disadvantage of difficulty of uniformity in placement and relatively easy displacement. Further, the conventional driveway edging structures of this type are relatively heavy and present a problem in the handling and manipulation thereof. Further, the known driveway edgings of this type are relatively costly. Still further, such driveway edging structures have the serious disadvantage of difficulty of providing other than simple geometric shapes thereby effectively limiting the aesthetic effect obtainable therewith.

SUMMARY OF THE INVENTION

The present invention comprehends an improved driveway edging structure which eliminates the disadvantages of the above discussed prior art driveway edging structures in a novel and simple manner. The driveway edging structure of the present invention includes a plurality of blocks having hinge means formed integrally therewith connecting the blocks serially to define an elongated unitary edging structure made up of a number of block elements for facilitated installation. The hinge means provides improved flexibility in the edging structure arrangement whereby the edging structure may be made to extend along any one of a plurality of edge configurations, including curved driveway edges. Stake means are associated with the edging structure for projecting downwardly therefrom to provide an improved retention of the edging structure along the driveway edge. The edging structure may be formed of molded plastic and the like to permit a wide range of ornamental configurations for improved aesthetic effect. The edging structure may comprise hollow blocks and, further, may be formed of plastic material for facilitated manufacture, low cost, and ease of handling and installation. The stakes may be removably associated with the blocks, or may be formed integrally therewith for improved retention of the edging structure.

The stake means may comprise an elongated stake having means for accurately positioning the stake for having the lower end thereof project a preselected distance downwardly below the bottom level of the blocks for facilitated installation. The blocks may comprise expanded foam blocks, or solid blocks, as desired. The stake means may be formed integrally with the blocks to provide a reinforcement thereof, such as where the blocks comprise hollow blocks. To further facilitate manufacture, and effectively minimize cost, as well as to facilitate handling and installation, the blocks may comprise hollow blocks opening downwardly through the bottom thereof.

BRIEF DESCRIPTION OF THE DRAWING

Other features and advantages of the invention will be apparent from the following description taken in connection with the accompanying drawing wherein:

FIG. 1 is a fragmentary perspective view of a driveway provided with an edging structure embodying the invention;

FIG. 2 is a fragmentary top plan view of the edging structure thereof;

FIG. 3 is a fragmentary enlarged vertical section taken substantially along the line 3—3 of FIG. 2;

FIG. 4 is a vertical section taken substantially along the line 4—4 of FIG. 3;

FIG. 5 is a horizontal transverse section taken substantially along the line 5—5 of FIG. 3;

FIG. 6 is a fragmentary front elevation of an edging structure embodying the invention;

FIG. 7 is a fragmentary transverse vertical section of a modified form of edging structure embodying the invention having an inegral stake means associated therewith;

FIG. 8 is a fragmentary vertical section taken substantially along the line 8—8 of FIG. 7; and FIG. 9 is a horizontal section taken substantially along the line 9—9 of FIG. 8.

DESCRIPTION OF THE PREFERRED EMBODIMENTS

In the exemplary embodiment of the invention as disclosed in FIGS. 1-5 of the drawing, a driveway edging structure generally designated 10, is shown to comprise a plurality of blocks 11, and hinge means 12, connecting the blocks 11 serially. Thus, the edging structure comprises an elongated unitary edging structure illustratively formed of three blocks 11, and cooperating pair of hinge means 12. A number of such edging structures may be placed end to end to define a continuous driveway edging designated 13, as illustrated in FIG. 1. As shown in FIG. 1, the edging 13 may define the edging of a driveway 14 with the edging 13 disposed on the ground alongside the driveway edge 15.

In the illustrated embodiment, the blocks 11 are formed of a lightweight, inexpensive material such as a plastic for facilitated and economical manufacture while yet permitting the blocks to have a desirable ornamental design for improved aesthetic effects in the driveway edging 13. The hinge means 12, as shown in FIG. 3, may comprise a portion of the edging 13 molded integrally with the blocks 11 providing a flexiblity in the edging structure 13 permitting the edging structure to extend lengthwise substantially along any one of a plurality of driveway edge configurations, including a curved driveway edge, as shown in FIG. 1. The blocks 11 may be hollow for improved ease in handling and installation. Illustratively, the upper wall 16 may have a curved configuration for improve aesthetic effect and, if desired, the side wall 17 may be provided with a decorative embossment 18.

The blocks at the hinge means 12 further define an upper flat wall 19, which in plan, as shown in FIG. 2, may comprise a generally triangular surface with the apices 20 of the confronting walls 19 defining the upper end of the hinge means 12 as shown in FIG. 3.

The bottom wall 21 of the blocks may rest on the ground G, as shown in FIG. 3, and the edging structure 10 may be retained in place along the driveway edge 15 by stakes 22 extending downwardly through walls 19 and bottom wall 21 into the subjacent ground G as shown in FIG. 3. The stakes may be provided with a head 23 which abuts the wall 19 to dispose the stakes 22 to project downwardly below the bottom wall 21 a preselected distance to provide desirable retention of the blocks. As shown in FIG. 3, a pair of stakes 22 may be disposed one each at opposite sides of the hinge means 12 for improved positive retention of the edging structure 10 in the desired configuration along the driveway edge 15.

As shown in FIG. 6, the invention further comprehends the provision of a modified form of block generally designated 111 which may comprise a more rigid block, such as one formed of foam or solid plastic material as desired. If desired, the stakes 112 may extend directly through the hinge means permitting a single stake 112 to be utilized in connection with each hinge means.

Referring now to the embodiment of FIGS. 7-9, a further modified form of block generally designated 211 is shown to comprise a hollow block generally similar to block 11 but having an open bottom 221. A stake structure 212 is formed integrally with the molded plastic block 211 and, as shown in FIG. 9, may comprise a stake having a cruciform cross-section with one pair of opposed arms 224 formed integrally with the side walls 217. Thus, the stake means 212 effectively defines a reinforcement of the hollow block while at the same time providing a unitary arrangement of the stake and block means for facilitated handling and installation.

Each of the blocks 111 and 211 is similar to block 11 except as otherwise noted above. Elements of blocks 111 and 211 corresponding to similar elements of block 11 are identified by similar reference numerals but 100 and 200 higher respectively.

As indicated above, for improved economy the driveway edging structure of the present invention may be molded from a suitable plastic. Thus, the edging structure may be injection molded. In the edging structure of the form shown in FIGS. 7-9, the stake means may be similarly injection molded integrally with the blocks for further economy.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. A driveway edging structure comprising: a plurality of blocks; flexible hinge means formed integrally with said blocks and extending substantially fully across the entire cross-section of said structure intermediate each pair of blocks for integrally connecting said blocks serially to define an elongated unitary edging structure, said hinge means providing a flexibility in said edging structure permitting said edging structure to extend lengthwise substantially along any one of a different plurality of driveway edge configurations including a curved driveway edge; and stake means extending vertically through said blocks closely adjacent said hinge means and projecting downwardly therefrom to retain the edging structure along the driveway edge.

2. The driveway edging structure of claim 1 wherein said blocks comprise hollow blocks.

3. The driveway edging structure of claim 1 wherein said blocks are formed of plastic.

4. The driveway edging structure of claim 1 wherein said stake means comprise a pair of stakes disposed one each at opposite sides of each said hinge means.

5. The driveway edging structure of claim 1 wherein said stake means comprise a stake element removably carried by said edging structure.

6. The driveway edging structure of claim 1 wherein said edging structure defines a flat upper surface, and said stake means comprises an elongated stake having a lower end and a head abutting said flat upper surface for positioning the stake to have said lower end project a preselected distance downwardly below the bottom level of said blocks.

7. The driveway edging structure of claim 1 wherein said stake means comprise a single stake extending through said hinge means.

8. The driveway edging structure of claim 1 wherein said stake means are formed integrally with said blocks.

9. The driveway edging structure of claim 1 wherein said blocks are hollow and said stake means extends through the hollow of said blocks.

10. The driveway edging structure of claim 3 wherein said stake means further defines means internally reinforcing said hollow blocks.

11. The driveway edging structure of claim 1 wherein said blocks are hollow and said stake means comprises means formed integrally with said blocks extending through the hollow of said blocks.

12. The driveway edging structure of claim 1 wherein said blocks are hollow and have a bottom portion opening downwardly.

13. The driveway edging structure of claim 1 wherein said stake means comprise elongated plastic means having a cruciform cross-section.

References Cited

UNITED STATES PATENTS

| | | | |
|---|---|---|---|
| 2,794,375 | 6/1957 | Di Falco et al. | 94—31 |
| 2,912,792 | 11/1959 | Venable | 47—33 |
| 3,373,668 | 3/1968 | Moore et al. | 47—33X |

ROBERT E. BAGWILL, Primary Examiner

U.S. Cl. X.R.

94—31